(12) United States Patent
Steinich et al.

(10) Patent No.: US 8,461,829 B2
(45) Date of Patent: Jun. 11, 2013

(54) MAGNETIC ANGLE SENSOR UNIT HAVING FERROMAGNETIC CONDUCTIVE SHIELDING

(75) Inventors: Klaus Manfred Steinich, Zorneding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 877 days.

(21) Appl. No.: 12/006,917

(22) Filed: Jan. 7, 2008

(65) Prior Publication Data

US 2008/0164866 A1     Jul. 10, 2008

(30) Foreign Application Priority Data

Jan. 8, 2007   (DE) .................... 20 2007 000 245 U
Apr. 20, 2007  (DE) ........................ 10 2007 018 759

(51) Int. Cl.
*G01B 7/30*          (2006.01)
(52) U.S. Cl.
USPC ............... 324/207.25; 324/207.2; 324/207.21
(58) Field of Classification Search
USPC .............................. 324/207.25, 207.2, 207.21
See application file for complete search history.

(56) References Cited

U.S. PATENT DOCUMENTS

| | | | | |
|---|---|---|---|---|
| 3,170,323 | A * | 2/1965 | Lippmann et al. | 73/862.326 |
| 4,262,526 | A * | 4/1981 | Makita et al. | 73/114.26 |
| 4,283,679 | A * | 8/1981 | Ito et al. | 324/165 |
| 4,392,375 | A * | 7/1983 | Eguchi et al. | 73/114.36 |
| 4,646,011 | A | 2/1987 | Wallrafen | |
| 5,094,920 | A * | 3/1992 | Shiozaki et al. | 428/472.1 |
| 5,148,106 | A * | 9/1992 | Ozawa | 324/207.21 |
| 5,202,305 | A * | 4/1993 | Watanabe et al. | 505/213 |
| 5,357,198 | A * | 10/1994 | Ando et al. | 324/242 |
| 5,572,120 | A * | 11/1996 | Takaishi et al. | 324/207.21 |
| 5,939,878 | A | 8/1999 | Dong | |
| 6,016,029 | A * | 1/2000 | Okayama et al. | 313/402 |
| 6,064,197 | A * | 5/2000 | Lochmann et al. | 324/207.14 |
| 6,288,533 | B1 * | 9/2001 | Haeberli et al. | 324/207.2 |
| 6,326,781 | B1 * | 12/2001 | Kunde et al. | 324/207.21 |
| 6,707,293 | B2 * | 3/2004 | Wan et al. | 324/207.25 |
| 6,806,702 | B2 * | 10/2004 | Lamb et al. | 324/207.25 |
| 7,013,741 | B2 * | 3/2006 | Nakamura et al. | 73/862.333 |
| 7,391,203 | B2 | 6/2008 | Modest | |
| 7,408,341 | B2 * | 8/2008 | Okuya et al. | 324/207.25 |

FOREIGN PATENT DOCUMENTS

| | | |
|---|---|---|
| DE | 2643286 | 9/1976 |
| DE | 19956313 | 11/1999 |
| DE | 69814387 T2 | 4/2004 |
| DE | 10345049 | 2/2005 |
| JP | 2001-174208 | 6/2001 |

* cited by examiner

*Primary Examiner* — Jay Patidar
(74) *Attorney, Agent, or Firm* — Head, Johnson & Kachigian, P.C.

(57) ABSTRACT

A sensor unit including a Hall or magnetoresistive angle sensor detecting around its longitudinal axis. The angle sensor includes a magnetically sensitive face surface portion and sensor element proximal to a face surface fixed in place. At least one magnet unit is disposed so that its magnetic field permeates the angle sensor, and field lines of at least one encoder magnetic of the at least one magnetic unit extend parallel to a sensitive plane of the sensor element wherein the encoder magnet is rotatable. A magnetically conductive shielding made of ferromagnetic material includes at least one sensor shielding fixed in place and an encoder shielding rotatable together with the encoder magnet.

11 Claims, 9 Drawing Sheets

MAGNETIC ANGLE SENSOR UNIT HAVING FERROMAGNETIC CONDUCTIVE SHIELDING

CROSS REFERENCE TO RELATED APPLICATIONS

This application claims priority to German Patent Application No. 20200700245.9 filed 8 Jan. 2007 and German Patent Application No. 1020070818759.0 filed 20 Apr. 2007.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable.

BACKGROUND OF THE INVENTION

1. Field of the Invention

The invention relates to a magnetic sensor unit having an angle sensor and an encoder, as they are used in the state of the art as an alternative to potentiometers, particularly comprising a plate-shaped flat embodiment of the angle sensor.

2. Background Art

In such magnetic angle sensors, the rotation angle transmission is performed between the encoder element, which is a magnet in this case, and the sensor element, which is provided in particular in the form of an electronic chip (I/C), exclusively by means of magnetic field lines, and above all without a mechanical coupling, so that the sensor element can be housed in a designated space, where it is mechanically completely encapsulated, as long as the magnetic fields of the encoder magnet can penetrate into this space up to the sensor element.

In the context of such sensor units, angle sensors, operating according to the Hall-principles, or according to the magnetoresistive principle are being used as sensor elements.

Definitions: The terms, which are mostly used in the claims have the following meaning:

The angle sensor 1 is the component, which includes the actual sensor element 4, typically provided as a chip 7.

The magnet 50 is the unit, which is typically opposite to the angle sensor 1 and which includes the encoder magnets 50*a, b*, which is configured to influence the angle sensor 1.

The sensor unit 100 is comprised of the angle sensor and the magnet unit 50.

The basic configuration and also the particular dimensions, in particular of the angle sensor of such a sensor unit, are generally determined by the application within tight limits, wherein it is often the case, that the available installation space allows a relatively large radial width of the angle sensor, but only a comparatively smaller axial extension, so that a flat, plate shaped angle sensor is required.

To the contrary, the magnetic angle sensors commercially available today are generally not optimized for a specific dimension (diameter or length), but mostly provided block shaped, with dimensions, which are approximately equal in all spatial directions.

BRIEF SUMMARY OF THE INVENTION

Thus it is an object of the invention to provide an angle sensor and a sensor unit, formed therewith, which is, on the one hand, optimized in shape and size for a specific exterior configuration (plate shape), and furthermore allows a user, which is independent from interfering magnetic fields being present in the area of application, or not.

The use also under the influence of interfering magnetic fields is accomplished through a magnetically conductive shielding around the sensor element, which is e.g. comprised of ferromagnetic material.

The shielding shall be provided, so that it is as tight as possible against the penetration of interfering fields into the inner cavity of the shielding, so that only the use field, generated by the encoder magnet, impacts the sensor element in this location.

In addition, the shielding, due to its magnetic conductivity, is to serve as a magnetic flux conductor for the magnetic use field, and shall thus effectuate on the one hand a targeted guidance of the use field of the encoder magnet, and optimize its flux guidance, and shall on the other hand conduct the unavoidable scatter portion of this use field into said shielding in a targeted manner.

For this purpose, the shielding, on the one hand, comprises a sensor shielding, covering at least the longitudinal sides of the sensor element, preferably also the backside of the sensor element, facing away from the encoder element, while the forward face surface pointing towards the encoder magnet, preferably must not be shielded, in order not to avoid the penetration of the use field.

The shielding furthermore preferably comprises an encoder shielding, shielding the encoder magnet on the longitudinal sides, and on the backside pointing away from the sensor element.

Preferably, the sensor shielding and the encoder shielding are pot shaped respectively, or dish shaped, in particular provided integral respectively, extending so close to each other with their open sides, or overlapping in axial direction, and reaching into each other in axial direction with a radial distance, which is so small that the penetration of an interfering field into the interior of the shielding is mostly avoided.

Thus, preferably the sensor shielding and the sensor element are disposed fixated in place, while the encoder shielding is rotatable together with the rotating encoder magnet.

In order to facilitate an engagement of the use field into the sensor element, regardless of the present rotation position of the encoder relative to the sensor element, the shielding is provided rotation symmetrical to the longitudinal axis of the angle sensor, which is advantageous in particular for multi-turn-applications, since herein the encoder magnet can not only change its angular position relative to the sensor element, but also its axial distance, since said encoder magnet is disposed on the front face of a thread, wherein also the processing of the magnet offset has to be performed with a high resolution, which is hardly possible with sufficient precision under the influence of interfering fields.

A sufficient shielding allows the use of angle sensors also in locations, where extremely strong interfering fields prevail, like e.g. on the shaft stub of an electric motor, where magnetic angle sensors have not been able to measure with high precision without a shielding so far.

The material of the shielding thus has a sufficiently high permeability of $\mu >> 100$, in particular $>1,000$, in particular $>50,000$, in order to facilitate the magnetic flux of the use field, while blocking interfering fields.

When the shielding has to be disposed very close to the sensor element, a shielding material with a low coercitive field strength Hc, or remanency has to be selected, since otherwise residual fields remain in the shielding material, which can influence the sensor precision.

At a distance of less than 10 mm to the sensor element, a magnetic shielding material with a HC<5 A/cm, better <1 A/cm, better <0.1 A/cm has to be selected.

With respect to the particular construction method, the magnetic shielding can be a separate component, which is e.g. injection molded from plastic bound ferrite, or sintered from hard ferrite, or comprised of nanocrystalline iron. The shielding, however, can also be an integral component of the housing itself, with the housing being comprised of a respective material, preferably a sleeve shaped cylindrical housing with a preferably closed bottom.

The housing can comprise a changed, thus enlarged or reduced, inner cross section at its front end, wherein the axial length of the reduced inner cross section corresponds to the rearward offset of the sensor element, and thus the sensor circuit board contacts on the inside at the shoulder between the reduced and the non-reduced inner cross section. The inner cross section of the housing is preferably circular.

The outer cross section of the housing comprises mounting devices for mounting to a surrounding component, in particular mounting ears, wherein the housing preferably also has a circular exterior circumference.

The housing can furthermore comprise a zero position marker on the outside at a location on the circumference, in particular a zero position groove, extending in longitudinal direction, whereby the zero position of the sensor element is characterized.

The forward face surface of the housing of the angle sensor is also closed mechanically, in order to protect the sensor element from detrimental effects. This closure can also be performed by means of a separate front cover, which is applied in a tight manner onto the front rim of the housing.

If the front cover is made from metal, preferably from non ferromagnetic material like e.g. brass and aluminum, welding onto the housing is preferred, in particular by means of a laser.

It has proven to be advantageous in particular, to produce such a front cover, which can also be integrally provided together with the remainder of the housing, even from a ferromagnetic material, as long as said front cover, at least in the center, symmetrical to the longitudinal axis, on which the sensor element is disposed, comprises a portion, in which the wall thickness is so small, that the magnetic force of the encoder magnet, disposed on the opposite side, is enough, in order to not only magnetically saturate this small wall thickness of ferromagnetic material, but to furthermore let the magnetic field lines penetrate through this portion into the interior of the angle sensor up to the sensor element.

This has the advantage that the field lines are conducted through the portion with the low field strength very precisely centric to this portion, and thus also when the outer encoder magnet is displaced eccentrically, tilted with its longitudinal axis, relative to the longitudinal axis of the angle sensor, or comprises other imprecise alignment features.

If the front cover is comprised of plastic, it is glued on, in particular pressed onto the encasement material, which is still soft, and which is also comprised of plastic, and by which the interior of the sensor housing is cast.

Thus, the front cover, which is comprised of plastic, can be in particular comprised of translucent plastic, so that an optical indicator in the interior, like e.g. a LED, becomes visible on the circuit board from the outside.

For the front cover, a shoulder can also be provided in the inner cross section of the housing between a reduced and a non-reduced cross section, in which the front cover contacts.

Furthermore, the front cover can also be provided as an overreaching pot shaped cover, which is slid over the housing from the open front side and glued, welded, or bolted down thereon.

Another possibility of the closure is to simply fill the interior of the housing with encasement material up to the front face, so that the encasement material itself constitutes the front cover. In particular a two-layer encasement is thus performed by initially encasing with an elastomeric, in particular silicone resin, or polyurethane resin, until the electric components are completely surrounded therewith.

Only the residual cavity is then encased with an outer layer of hard material, e.g. epoxy resin, which builds up tensions during hardening, which can damage the electrical components in case of a direct encasement.

By the same token, the encasement can be performed overall in one layer and with a not completely hardening encasement material, thus an elastomeric like polyurethane.

Furthermore, there is another possibility to improve the measurement result of the angle sensor, if the indicator magnet is not positioned exactly in the center, and coincident with the longitudinal axis of the angle sensor, but tilted or radially offset relative to it.

When an intermediary unit is disposed between the angle sensor and the magnet unit, said intermediary unit again has a centering effect.

For this purpose an intermediary magnet is disposed rotatable around the longitudinal axis in the intermediary unit, wherein the pole axis of the intermediary magnet is disposed preferably transversal to the longitudinal axis, and thus to the rotation axis of the intermediary magnet.

In a preferred embodiment, this intermediary magnet is supported in the intermediary unit by means of a magneto fluid, which yields particularly low friction forces in the support.

The intermediary unit can be a simple disk, e.g. made from plastic, which can either be disposed in the interior of the housing of the angle sensor, or in the interior of the housing of the magnet unit, in particular inserted.

Preferably, the sensor unit can also be provided with two galvanically separated sensor elements, in order to achieve 100% redundancy. Both sensor elements can even be disposed on the same IC. Preferably, then also two separate and galvanically separated cable exits are provided at the sensor unit.

The processing electronics of the angle sensor are preferably still programmable in a completely finished, also encased state, either by means of at least one additional electrical conductor in the cable, or wirelessly by means of radial or optical signals.

The angle sensor of the sensor unit is provided plate shaped, thus has a relatively large radial extension, which is larger, in particular at least two times the size of the axial extension, measured on the axis, perpendicular to the plane of the sensor element. Thus, the radial extension is preferably at least three times the size of the axial extension.

This is accomplished by the sensor element, which is provided in particular as a chip, being disposed in parallel to the main plane of the angle sensor, thus of its housing and preferably on the front side, facing the opening of the housing. In order to allow a simple manufacture, the housing is preferably provided in the shape of a flat pot, which is preferably comprised of ferromagnetic material, iron in particular, which acts as a shielding, or which houses a pot shaped insert made from such material, in which the sensor is housed. The housing comprises a preferably round inner contour and the circuit board, on which the sensor element and the processing unit are disposed, also comprise an analogue, round outer contour, which precisely fits into the inner contour of the housing, in particular contacts on a respective shoulder of the inner cross section of the housing, whereby the axial positioning of the sensor element is predetermined.

The housing of the angle sensor is mounted to a component in the vicinity by means of mounting devices, which are disposed at the exterior surfaces, preferably at the longitudinal exterior surfaces of the housing, e.g. mounting ears, engaging in clamping grooves, circumferential on the outside of the housing.

Through a special design of the cable output portion on the closed backside, pointing away from the sensor element, of the mostly pot shaped housing, the same housing can be used for axial, and also for radial cable outputs.

For this purpose, a portion protrudes on the backside of the housing from a flat base surface, wherein the elevations of said portion are slightly higher than the diameter of the cable to be run out. In this axial view, this raised portion comprises approximately tangential indentations, whose width is slightly larger than the diameter of the cable to be run out.

Preferably, two, or even several of those indentations are distributed along the circumference.

At the base of the indentation, a pass-through opening for the cable leads into the interior of the housing.

The interior flank of the indentation thus transitions without a step into a convex arc shaped contour, which transitions from the indentation into the outer contour of the non-raised portion.

The outward located flank of the indentation forms a rounded tip with the outer contour of the non-protruding portion, wherein the non-protruding portion, thus the flat base surface, typically comprises a round outer contour.

Through this embodiment, the cable, which is run out in a tangential direction from the indentation, can either be run out in a tangential direction along the rounded inner flank, or the radial distance from the outer end of the pass-through opening up to the outer contour of the non-protruding portion is used, in order to redirect the cable into an axial position, so that an axial run out path of the cable is created, which does not protrude beyond the outer circumference of the housing.

Preferably, an inner thread is manufactured into the pass-through opening and adapted to the interior diameter of the cable, so that the cable with its exterior jacket can be threaded into the interior thread, which digs into the exterior circumference of the cable jacket in a self-cutting manner, wherein, on the one hand, a very tight cable input is assured and, on the other hand, a form locked mechanical pull relief for the cable is realized in a simple and space saving manner with respect to the housing.

In order to avoid the penetration of longitudinal water along the cable into the interior of the housing, which would very quickly render the sensor nonfunctional, also the insulations of the single strands are removed in the interior of the housing in a portion, where the jacket of the cable has already been removed, wherein a sufficient spacing of the strands, where the insulation has been stripped, has to be assured relative to each other, if necessary by means of mechanical spacers.

The encasement of the interior of the housing is thus performed, so that the portion of the cable, in which the cable jacket ends, and from which the particular strands protrude, is encased, and also the portion of the strands, in which its particular strand insulations end, or have been interrupted. Preferably, the interior of the housing is completely encased up to the forward opening of the housing and thus measures have to be taken, so that no air inclusions are created in the encasement. Thereby, longitudinal water cannot penetrate into the housing, neither in the cavities between the electrical conductor and the strand insulation, no in the gaps between the particular strand insulations and the insulating jacket.

BRIEF DESCRIPTION OF THE SEVERAL VIEWS OF THE DRAWINGS

Embodiments are subsequently described in more detail in an exemplary manner as follows.

DETAILED DESCRIPTION OF THE INVENTION

Figure 1A:
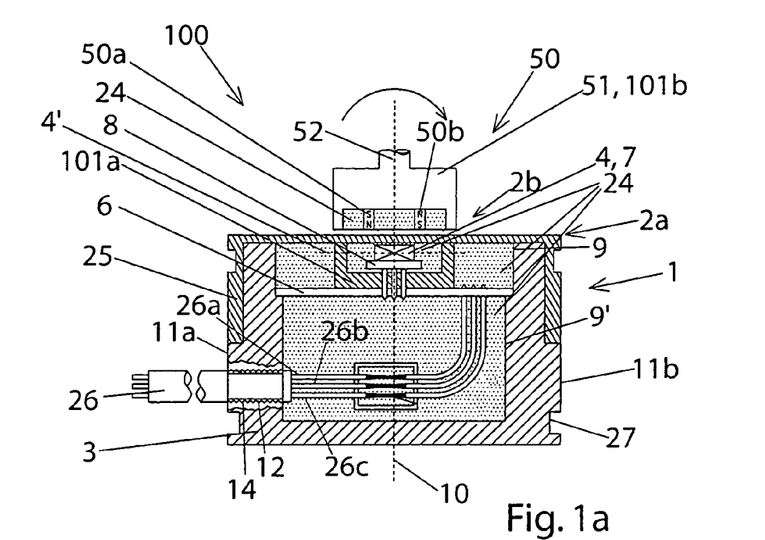
FIGS. 1*a-c* show a first embodiment of a sensor unit according to the invention comprising different cable outputs.

FIG. 1*a* shows a sensor unit 100 comprised of an angle sensor 1 and a magnet unit 50, comprising two encoder magnets 50*a, b*, cut along the axes 10*a, b*, which are preferably shared by the magnet unit 50 and the angle sensor 1, wherein the encoder is rotatable around its rotation axis 10*b*, relative to the typically still standing angle sensor 1.

The magnet unit 50 is thus comprised of an encoder core body 51, typically provided as a symmetrical, in particular rotation symmetrical in top view, circular, e.g. core body 51, from whose backside a not completely illustrated central pinion 52 protrudes by means of which the core body 51 can be inserted into a blind bore hole of another component, or clamped.

On or in the forward face surface of the core body 51, the actual encoder is mounted, comprised in this case of a pot shaped, encoder shielding 101*b*, which is also symmetric in top view, in particular rotation symmetric, e.g. circular, which points away with its open side from the core body 51 in the direction of the angle sensor 1, and in whose open side in this case two encoder magnets 50*a, b* are disposed opposite to each other, and symmetrical to the rotation axis 10*b*, so that their pole axes extend in parallel to the axis 10*b*, and so that they point in the direction of the angle sensor 1 with different poles.

The two encoder magnets 50*a, b* are fixated in place in the pot shaped shielding 101*b*, since they are encased e.g. by a hardening encasement material 24 in this recess, wherein neither the encasement material 24, nor the magnets protrude beyond the front rim of the pot shaped encoder shielding 101*b* on the face side.

Directly opposed to the encoder magnets 50*a, b*, the angle sensor 1 is disposed, which also comprises a rotation symmetrical, circular symmetrical, in particular rotation symmetrical, round e.g. base surface, but overall with a larger diameter than the encoder, and with an axial extension, which is less than the diameter, in particular only half the size, or one third the size of the diameter, so that a more plate shaped embodiment of the angle sensor 1 is provided.

The sensor element 4 of the angle sensor is provided in the form of a chip 7 on a sensor circuit board 8, which is disposed in parallel to the main circuit board of the angle sensor 1, and thus with respect to the face surface of the encoder 50, and thus in the recess of a pot shaped sensor shielding 101a, facing the encoder.

The sensor shielding 101a is located on the front side of a main circuit board 6, with which the sensor circuit board 8 is electrically connected through the sensor shielding 101a, and the main circuit board 6, on which the remainder of the processing electronics is disposed, contacts on the shoulder between the normal round inner cross section 9 and a reduced inner cross section 9' in the typically circular inner circumference of a pot shaped housing 3, wherein the larger inner diameter 9 is disposed towards the free end of the pot shaped housing, thus towards the encoder 50, so that the main circuit board 8 can be placed onto the shoulder from there.

At the main circuit board 6, the strands 26a, b, c of a cable 26 are electrically connected, wherein said cable is run through the housing 30, in this case radially to the outside, in order to transmit the signals of the angle sensor 1 to the outside.

Thus, it is evident that the jacket insulation of the cable 26 ends short within the housing 3, and is threaded into an inner thread 12, which is manufactured into the pass-through opening 14 for the cable 26 in the housing 3, for pull relief.

It is furthermore evident, that in the portion of the removed cable jacket, also the particular strands 26a, b, c are relieved of their respective strand insulations, and held at a distance by mechanical spacers in this portion, in order to avoid an electrical contact.

The inner free space in the housing 3, and thus below, and also above the main circuit board 6, and also the recess in the sensor shielding 101a around the sensor element 4 is completely encased respectively by means of a hardening encasement material 24, whereby all components mentioned above on the one hand are held in position, and on the other hand are protected against a penetration of moisture to the electrical components. In particular, thereby the penetration of longitudinal water between the cable jacket and the particular strands, and also between the strand insulations and the strands into the interior of the angle sensor 1 is avoided.

Additionally, the face surface 2a pointing towards the encoder, thus the open side of the housing 3 is protected by a front cover 25, which is also configured pot shaped, and which is slid over the open front side of the housing 3 as a slide-over cover, and reaches over it in axial direction over part of its longitudinal sides 11a, b.

Since the distance between the encoder 50 and the angle sensor 1 in axial direction is small, and the front cover 25 is comprised of a non-magnetizable material, the sensor element 4 furthermore detects rotating movements of the encoder 50.

Furthermore the clamping grooves 27 are illustrated, which are disposed circumferential in the longitudinal sides 11a, b in the housing 3, and/or in the front cover 25 and/or (in the additional figures) in the magnet unit 50, respectively preferably at the same distance to the adjacent front face, which are used for engaging the clamping claw 28, and which are thus used for mounting, as shown in some of the Figures.

Figure 1B:
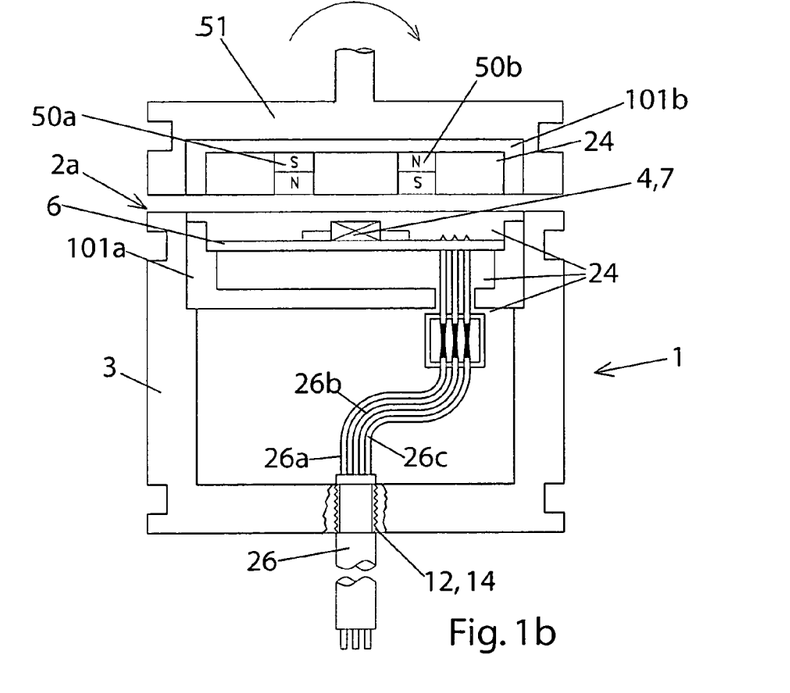

The solution in FIG. 1b differs from the one in FIG. 1a, in particular through its configuration and through the cable routing of the angle sensor 1.

While in the solution according to FIG. 1a the sensor shielding 101a has a relatively small base surface, e.g. according to the encoder shielding 101b, and mostly only receives the sensor element 4 and the supporting sensor circuit board 8, only the main circuit board 6 is provided in the solution according to FIG. 1b, on which the sensor element 4, and also the entire processing electronics are disposed, and which therefore has a surface, which mostly corresponds to the free inner cross section of the pot shaped housing 3.

Accordingly, the sensor shielding 101a is also provided pot shaped, but with a substantially larger base surface, so that it extends substantially over the entire inner free surface of the pot shaped housing 3, and sits in a certain axial position on a respective diameter, a shoulder of the interior diameter of the housing 3, while the main circuit board 6 itself rests on a respective shoulder in the inner diameter of the pot shaped sensor shielding 101a.

Also here, the entire interior cavity of the housing 3 is filled with encasement material 24 on both sides of the shielding 101a, and also of the main circuit board 6, and encased for subsequent hardening.

The cable 26, in this case, is run axially backward through the bottom of the housing to the outside, but the pull relief and also the sealing against the penetration of longitudinal water is realized analogous to the solution of FIG. 1a.

Additionally the core body 51 of the magnet unit 50 has a base surface in this embodiment, which is the same size, as the face surface 2a of the angle sensor 1

Figure 1C:
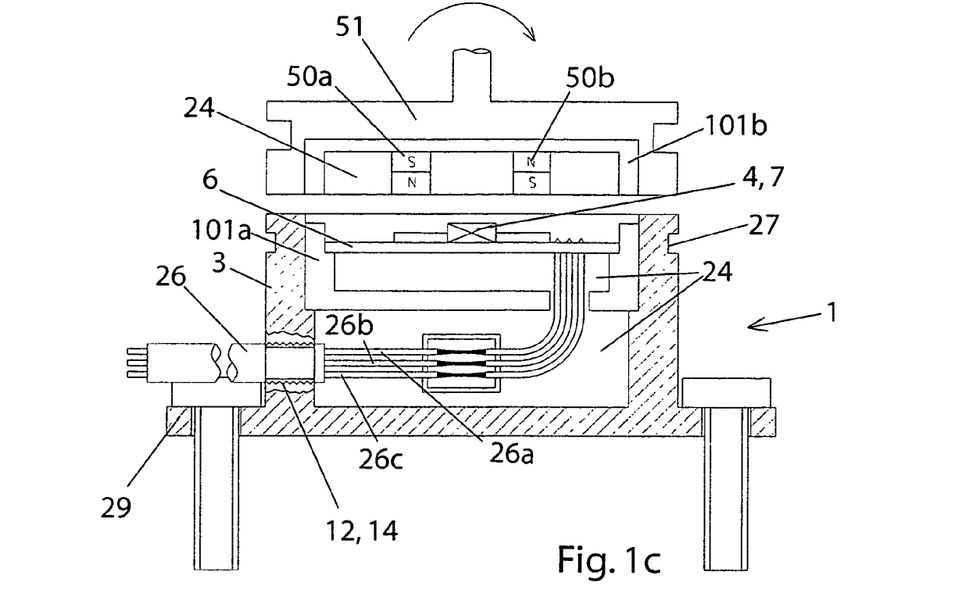

The solution of FIG. 1c corresponds to the one of FIG. 1b, besides the fact, that the cable output again extends sideways, thus through the wall of the pot shaped housing 3, like in the solution according to FIG. 1a, and on the backside of the housing 3 a mounting flange 29 protrudes radially, comprising arc shaped axial pass through openings.

Figure 2A:
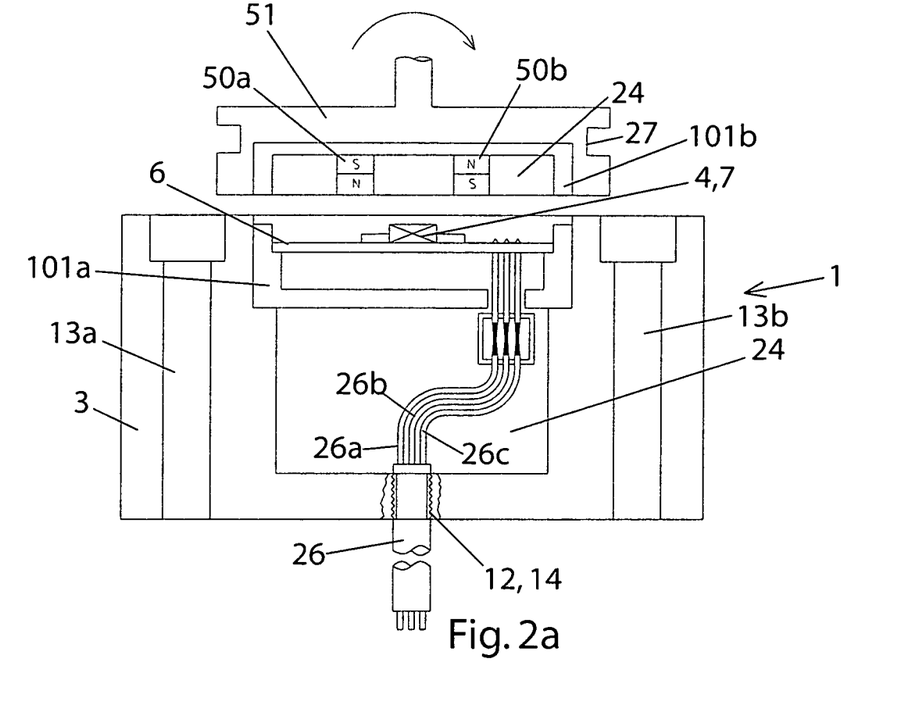
FIGS. 2*a-b* show different types of guidance of an encoder element.
Figure 2B:
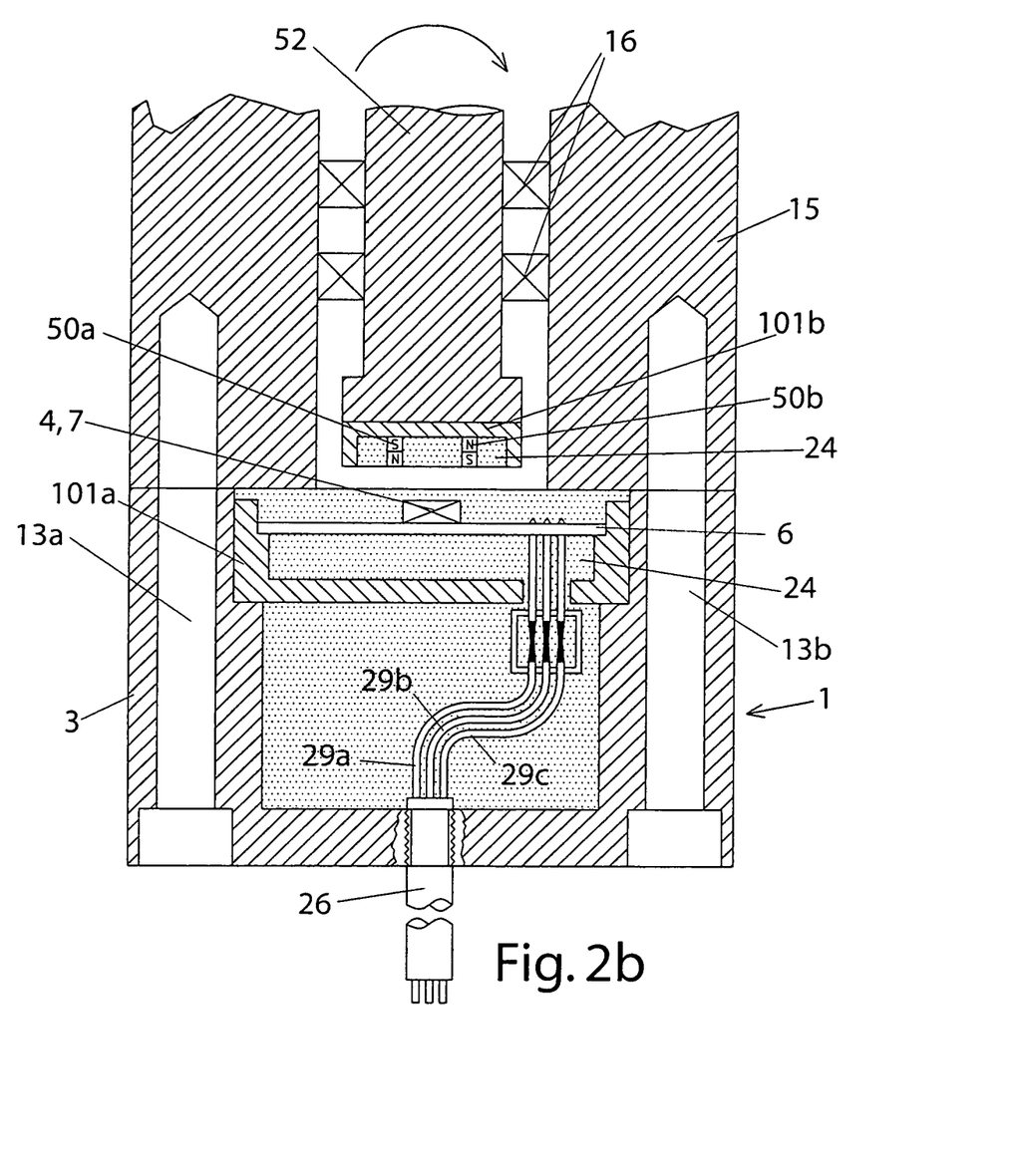

FIG. 2a shows a sensor unit, corresponding to the one of FIG. 1b, besides the fact, that the walls of the pot shaped housing 3 of the angle sensor 1 in radial direction are provided much thicker, so that in axial direction from the forward to the rear front face along, and in the interior of the side walls, mounting bore holes 13a, b can be disposed, through which the angle sensor 1 can be bolted to a surrounding component, as shown e.g. in the application according to FIG. 2b.

There the angle sensor 1 is bolted onto the forward front face of the hollow pinion 15 by means of the mounting bore holes 13a, b, so that the angle sensor 1 is disposed directly on its forward face surface.

In the interior of the support housing 15, the pinion 52 of the encoder core body 51 is supported by bearings 16, and thus the entire encoder is supported, which is otherwise provided like in the FIGS. 1a, b, c.

Figure 3A:
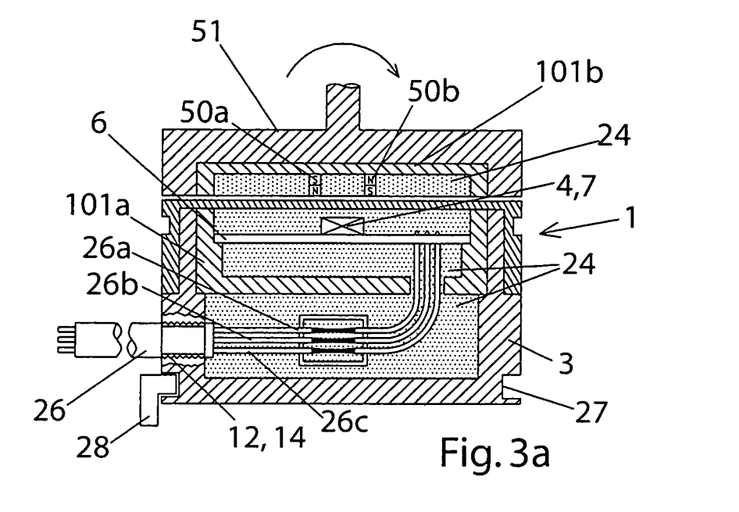
FIGS. 3*a-d* show different embodiments of an encoder element.

The solution of FIG. 3a on the side of the angle sensor 1 corresponds to the solution of FIG. 1b, besides the fact, that the open side of the housing 3, thus towards the encoder, is additionally covered by a front cover 25 in the form of a slide-over cover, as provided in FIG. 1a.

Furthermore, the encoder is provided differently, whose core body 51, in this case, has a base surface, which has the same size as the one of the housing 3 of the angle sensor 1, and wherein the core body is not provided plate shaped, but also pot shaped, like the also pot shaped encoder shielding 101b, which is also received therein.

Differing from the above solution, the encoder in the solution according to FIG. 3b is again provided with a smaller base surface and in analogy to the FIG. 1a.

Figure 4A:
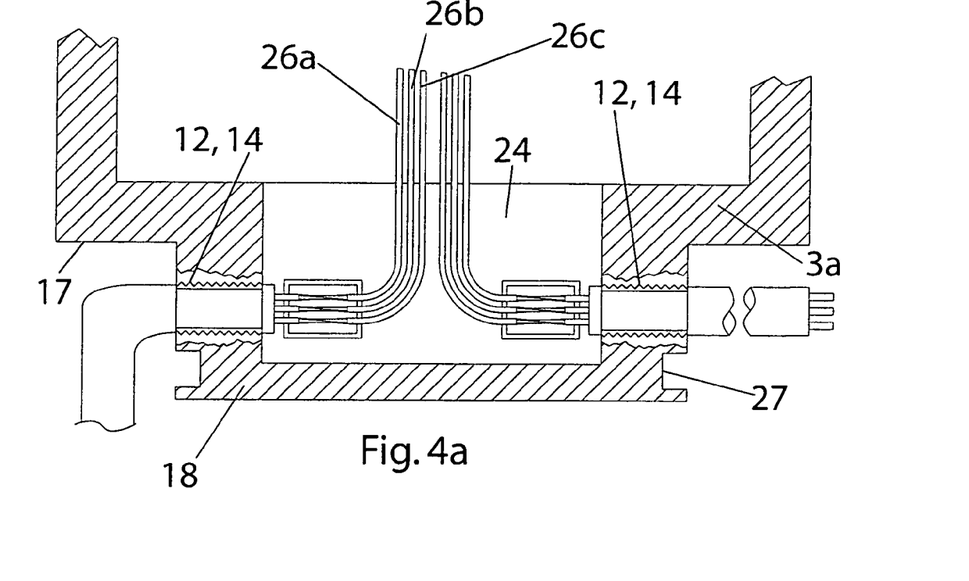
FIGS. 4*a-b* show particular embodiments of the cable output of the angle sensor.
Figure 4B:
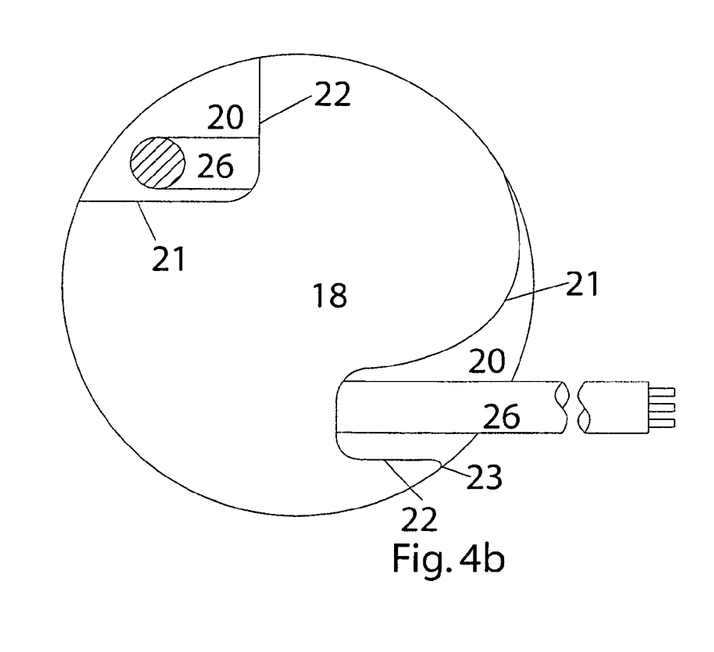

FIGS. 4a and 4b show in a longitudinal sectional view, and in top view from the backside, a special embodiment of the cable output, in particular with two cable outputs from the housing 3 of the angle sensor 1.

Figure 3B:
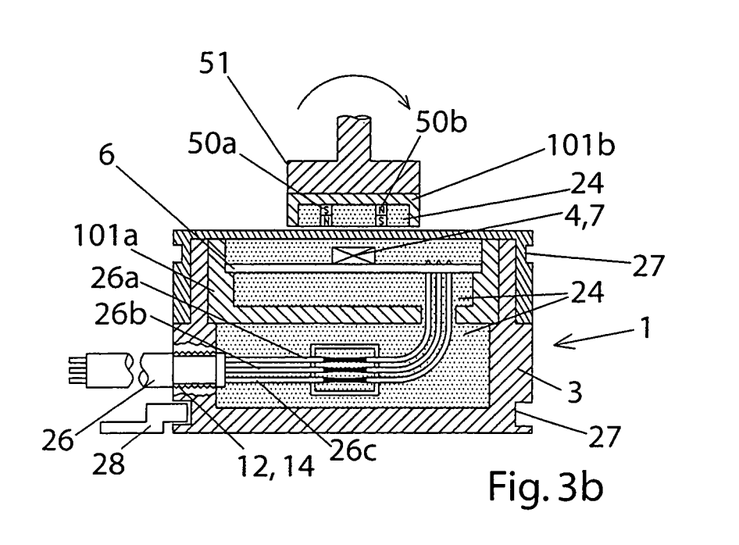
Figure 3C:
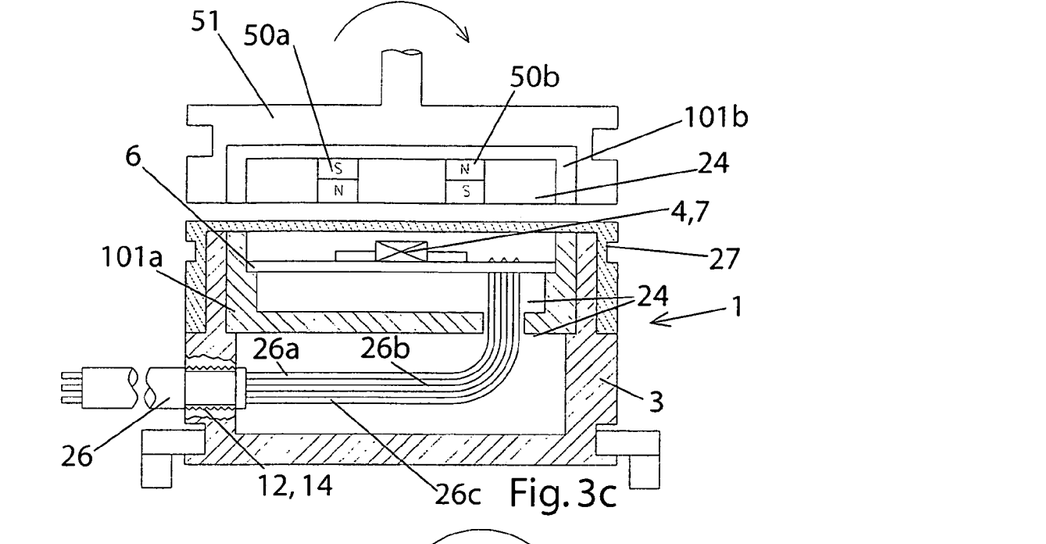

FIG. 3c corresponds to the embodiment of FIG. 3b, however the strands 26a, b, c of the cable 26 do not have their insulation additionally removed in portions in the interior of the angle sensor 1.

Figure 3D:
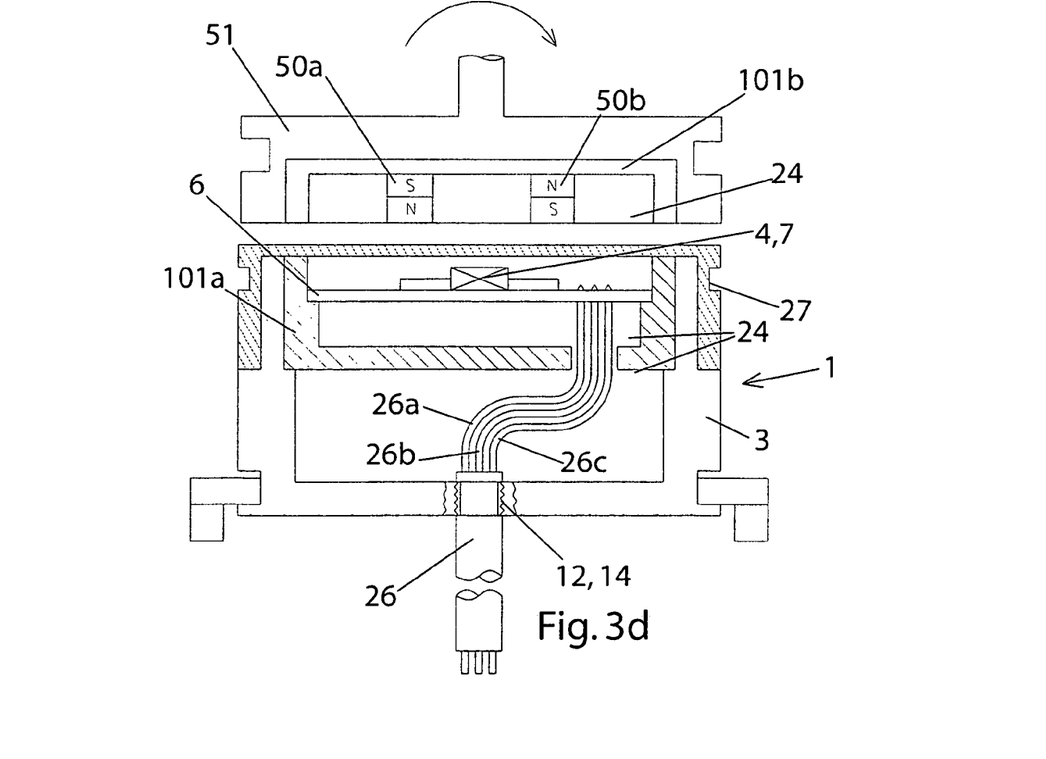

FIG. 3d corresponds to the solution of FIG. 3c, however with an axial cable output, thus through the rear wall of the housing 3.

The bottom 3a of the housing 3 thus serves as a base surface 17 for a raised portion 18, extending centrally downward outward there from, which in turn is provided pot shaped, and which comprises two diametrically opposed tangentially oriented indentations 20, into whose base the pass-through openings 14, preferably with inner threads 12 for the cable 26, open out. The pass-through openings 14 thus extend in parallel to the main plane, and thus to the bottom 3a of the pot shaped housing 3, into the side wall of the also pot shaped raised portion 18, which is provided integral with the remainder of the housing 3.

Thus, the configuration of this indentation 20 is quite important, which comprises an inner flank 21 and an outer flank 22, with respect to the center of the housing 3, viewed in axial direction.

In the simplest case the indentation 20 is shown rectangular with a flank in the direction of the extension of the cable 26, as described above on the left. On the lower right side the preferred embodiment is shown.

While the outer flank transitions into the outer contour 17' of the base surface 17 in a convex cambered arc shape, viewed in FIG. 4b, the inner flank transitions approximately parallel to the outer flank 22 in a concave camber into a tip 23, which, on the one hand, is formed by the outer contour 17' and, on the other hand by the outer flank 22.

As shown by FIG. 4b on the right bottom, the cable 26 can be routed in this manner in the plane of the elevated portion 18, and in parallel to the bottom 3a of the housing 3, radially, or if required, also tangentially away from the housing 3, wherein the inner flank 21 avoids a kinking of the cable.

By the same token, the cable 26, however, as shown in FIG. 4b in the left upper side, can be run out axially by using the portion of the indentation 20 for redirecting the cable 26 into an axial direction, thus parallel to the longitudinal axis 10 of the housing 3, wherein this cavity typically suffices, so that the cable 26 hereby does not radially protrude beyond the outer rim of the housing 3, and also does not have to be kinked too much, since in addition to the bending into the axial direction, also a tangential guidance is performed along the inner flank 21, and thus the bending is performed in a comparatively gentle manner.

Figure 5:
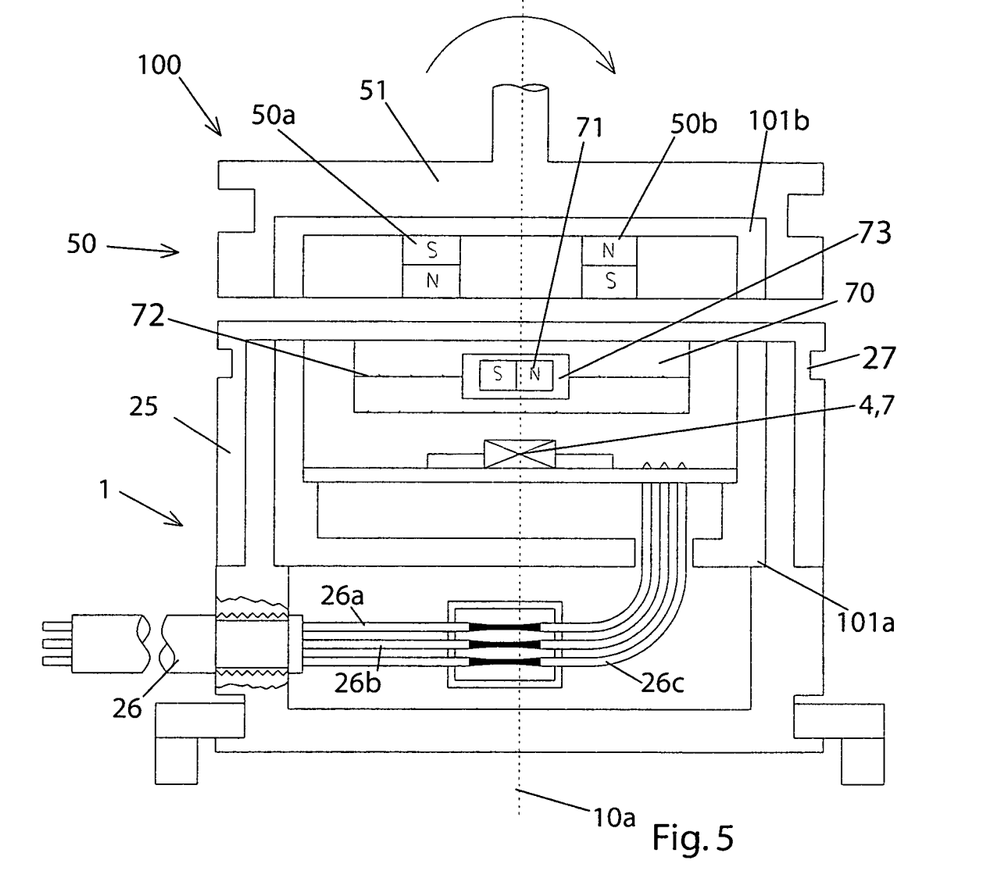
FIG. 5 shows a particular front cover.
Figure 6:
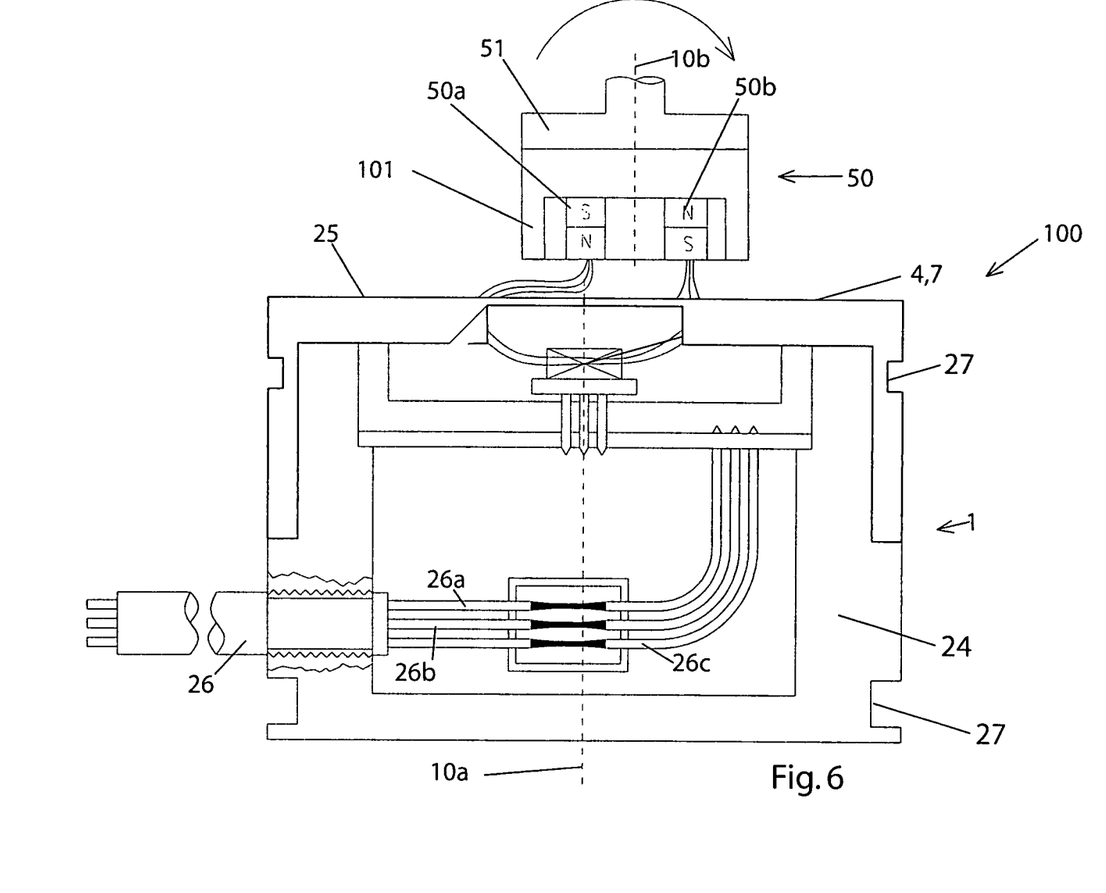
FIG. 6 shows a solution with an intermediary unit.

The FIGS. 5 and 6 show additional possibilities, how to improve the measuring precision of the sensor unit 100.

Thus, FIG. 5 shows a sensor unit 100, which corresponds to the one of FIG. 3a besides the fact that in FIG. 5 an additional intermediary unit 70 is provided in the angle sensor 1.

The intermediary unit 70 is a disk shaped body, which is disposed in the housing 3 of the angle sensor 1, and preferably also within its shielding 101a, and thus in front of the sensor element 4, so that it is disposed between the sensor element 4 and the magnet unit 50.

The exterior circumference of the intermediary unit 70 can be sized, so it fits the inner circumference of the pot shaped sensor shielding 101a, and/or the intermediary unit 70 can be mounted to the inside of the front cover 25, which is provided here as a slide-over cover.

In the intermediary unit 70, an encoder magnet 71 is disposed with its pole axis 72 in the direction of the main axis of the disk shaped intermediary unit 70, and thus perpendicular to the longitudinal axis 10a of the angle sensor 1 on this longitudinal axis rotatable in the intermediary unit 70.

In order to achieve a support that has as little friction as possible, the encoder magnet 71 is supported in the encoder unit 70 by means of a magnetofluid or ferrofluid 73, which constitutes a lubricant and the bearing, and which adheres to the magnet, due to very fine iron particles, which are dissolved in the lubricating fluid.

Thereby, the lubricant always stays in the support gap. Running the bearing dry is avoided without any additional measures.

The magnet lines of the two encoder magnets 50a, b in this case, thus impact the intermediary magnet 71 and rotate with it, and its field lines initially impact the sensor element 4.

The advantage is that the intermediary magnet 71 is always in the same defined correct axial position with respect to the sensor element 1.

An axial or radial offset of the encoder magnet(s) 50a, b relative to the longitudinal axis 10 still causes an angle synchronous engagement of the intermediary magnet 71, and thus initiates a correct measurement at the sensor element 4, which would be performed significantly worse under the direct effect of incorrectly placed encoder magnets 50a, b, relative to the sensor element 4, under direct effect.

The solution of FIG. 6 has the same object and differs from the one in FIG. 1a only through the configuration of the front cover 25.

Said front cover is comprised of magnetically conductive material, e.g. soft magnetic highly permeable materials, in particular magnetic NiFe-alloy, e.g. the Permalloy group, which is paradox at first glance, since hereby a shielding effect is accomplished relative to the encoder unit 50, which is intended to impact the sensor element 4.

This is actually the case in the radially exterior portions of the front cover 25, since it has a relatively large wall thickness.

In the center portion around the longitudinal axis 10a, on which also the sensor element 4 is located, the material thickness of the front cover 25, which shields in principle is reduced strong enough, so that the field strength of the magnet unit 50 suffices in order to not only saturate this small wall thickness magnetically, but to furthermore permeate it with field lines up to the sensor element 4.

The advantageous effect is thus that in a not correctly aligned encoder unit 50, like e.g. shown in FIG. 6, in case of an eccentrically slightly offset rotation axis 10b of a magnet unit 50, the field lines originating from the encoder magnets 50a, b are centered by the portion of the reduced wall thickness to its center, this means the sensor element 4, and thus the measurement result is degraded less through the incorrect spatial alignment of the magnet 50 with the angle sensor 1, than without such configuration of the cover 25. encoder is rotatable around its rotation axis 10b, relative to the typically still standing angle sensor 1.

The magnet unit 50 is thus comprised of an encoder core body 51, typically provided as a symmetrical, in particular rotation symmetrical in top view, circular, e.g. core body 51, from whose backside a not completely illustrated central pinion 52 protrudes by means of which the core body 51 can be inserted into a blind bore hole of another component, or clamped.

On or in the forward face surface of the core body 51, the actual encoder is mounted, comprised in this case of a pot shaped, encoder shielding 101b, which is also symmetric in top view, in particular rotation symmetric, e.g. circular, which points away with its open side from the core body 51 in the direction of the angle sensor 1, and in whose open side in this case two encoder magnets 50a, b are disposed opposite to each other, and symmetrical to the rotation axis 10b, so that their pole axes extend in parallel to the axis 10b, and so that they point in the direction of the angle sensor 1 with different poles.

The two encoder magnets 50a, b are fixated in place in the pot shaped shielding 101b, since they are encased e.g. by a hardening encasement material 24 in this recess, wherein neither the encasement material 24, nor the magnets protrude beyond the front rim of the pot shaped encoder shielding 101b on the face side.

Directly opposed to the encoder magnets 50a, b, the angle sensor 1 is disposed, which also comprises a rotation symmetrical, circular symmetrical, in particular rotation symmetrical, round e.g. base surface, but overall with a larger diameter than the encoder, and with an axial extension, which is less than the diameter, in particular only half the size, or one third the size of the diameter, so that a more plate shaped embodiment of the angle sensor 1 is provided.

The sensor element 4 of the angle sensor is provided in the form of a chip 7 on a sensor circuit board 8, which is disposed in parallel to the main circuit board of the angle sensor 1, and thus with respect to the face surface of the encoder 50, and thus in the recess of a pot shaped sensor shielding 101a, facing the encoder.

The sensor shielding 101a is located on the front side of a main circuit board 6, with which the sensor circuit board 8 is electrically connected through the sensor shielding 101a, and the main circuit board 6, on which the remainder of the processing electronics is disposed, contacts on the shoulder between the normal round inner cross section 9 and a reduced inner cross section 9' in the typically circular inner circumference of a pot shaped housing 3, wherein the larger inner diameter 9 is disposed towards the free end of the pot shaped housing, thus towards the encoder 50, so that the main circuit board 8 can be placed onto the shoulder from there.

At the main circuit board 6, the strands 26a, b, c of a cable 26 are electrically connected, wherein said cable is run through the housing 30, in this case radially to the outside, in order to transmit the signals of the angle sensor 1 to the outside.

Thus, it is evident that the jacket insulation of the cable 26 ends short within the housing 3, and is threaded into an inner thread 12, which is manufactured into the pass-through opening 14 for the cable 26 in the housing 3, for pull relief.

It is furthermore evident, that in the portion of the removed cable jacket, also the particular strands 26a, b, c are relieved of their respective strand insulations, and held at a distance by mechanical spacers in this portion, in order to avoid an electrical contact.

The inner free space in the housing 3, and thus below, and also above the main circuit board 6, and also the recess in the sensor shielding 101a around the sensor element 4 is completely encased respectively by means of a hardening encasement material 24, whereby all components mentioned above on the one hand are held in position, and on the other hand are protected against a penetration of moisture to the electrical components. In particular, thereby the penetration of longitudinal water between the cable jacket and the particular strands, and also between the strand insulations and the strands into the interior of the angle sensor 1 is avoided.

Additionally, the face surface 2a pointing towards the encoder, thus the open side of the housing 3 is protected by a front cover 25, which is also configured pot shaped, and which is slid over the open front side of the housing 3 as a slide-over cover, and reaches over it in axial direction over part of its longitudinal sides 11a, b.

Since the distance between the encoder 50 and the angle sensor 1 in axial direction is small, and the front cover 25 is comprised of a non-magnetizable material, the sensor element 4 furthermore detects rotating movements of the encoder 50.

Furthermore the clamping grooves 27 are illustrated, which are disposed circumferential in the longitudinal sides 11a, b in the housing 3, and/or in the front cover 25 and/or (in the additional figures) in the magnet unit 50, respectively preferably at the same distance to the adjacent front face, which are used for engaging the clamping claw 28, and which are thus used for mounting, as shown in some of the Figures.

The solution in FIG. 1b differs from the one in FIG. 1a, in particular through its configuration and through the cable routing of the angle sensor 1.

While in the solution according to FIG. 1a the sensor shielding 101a has a relatively small base surface, e.g. according to the encoder shielding 101b, and mostly only receives the sensor element 4 and the supporting sensor circuit board 8, only the main circuit board 6 is provided in the solution according to FIG. 1b, on which the sensor element 4, and also the entire processing electronics are disposed, and which therefore has a surface, which mostly corresponds to the free inner cross section of the pot shaped housing 3.

Accordingly, the sensor shielding 101a is also provided pot shaped, but with a substantially larger base surface, so that it extends substantially over the entire inner free surface of the pot shaped housing 3, and sits in a certain axial position on a respective diameter, a shoulder of the interior diameter of the housing 3, while the main circuit board 6 itself rests on a respective shoulder in the inner diameter of the pot shaped sensor shielding 101a.

Also here, the entire interior cavity of the housing 3 is filled with encasement material 24 on both sides of the shielding 101a, and also of the main circuit board 6, and encased for subsequent hardening.

The cable 26, in this case, is run axially backward through the bottom of the housing to the outside, but the pull relief and also the sealing against the penetration of longitudinal water is realized analogous to the solution of FIG. 1a.

Additionally the core body 51 of the magnet unit 50 has a base surface in this embodiment, which is the same size, as the face surface 2a of the angle sensor 1

The solution of FIG. 1c corresponds to the one of FIG. 1b, besides the fact, that the cable output again extends sideways, thus through the wall of the pot shaped housing 3, like in the solution according to FIG. 1a, and on the backside of the housing 3 a mounting flange 29 protrudes radially, comprising arc shaped axial pass through openings.

FIG. 2a shows a sensor unit, corresponding to the one of FIG. 1b, besides the fact, that the walls of the pot shaped housing 3 of the angle sensor 1 in radial direction are provided much thicker, so that in axial direction from the forward to the rear front face along, and in the interior of the side walls, mounting bore holes 13a, b can be disposed, through which the angle sensor 1 can be bolted to a surrounding component, as shown e.g. in the application according to FIG. 2b.

There the angle sensor 1 is bolted onto the forward front face of the hollow pinion 15 by means of the mounting bore holes 13a, b, so that the angle sensor 1 is disposed directly on its forward face surface.

In the interior of the support housing 15, the pinion 52 of the encoder core body 51 is supported by bearings 16, and thus the entire encoder is supported, which is otherwise provided like in the FIGS. 1a, b, c.

The solution of FIG. 3a on the side of the angle sensor 1 corresponds to the solution of FIG. 1b, besides the fact, that the open side of the housing 3, thus towards the encoder, is additionally covered by a front cover 25 in the form of a slide-over cover, as provided in FIG. 1a.

Furthermore, the encoder is provided differently, whose core body 51, in this case, has a base surface, which has the same size as the one of the housing 3 of the angle sensor 1, and wherein the core body is not provided plate shaped, but also pot shaped, like the also pot shaped encoder shielding 101b, which is also received therein.

Differing from the above solution, the encoder in the solution according to FIG. 3b is again provided with a smaller base surface and in analogy to the FIG. 1a.

FIGS. 4a and 4b show in a longitudinal sectional view, and in top view from the backside, a special embodiment of the cable output, in particular with two cable outputs from the housing 3 of the angle sensor 1.

FIG. 3c corresponds to the embodiment of FIG. 3b, however the strands 26a, b, c of the cable 26 do not have their insulation additionally removed in portions in the interior of the angle sensor 1.

FIG. 3d corresponds to the solution of FIG. 3c, however with an axial cable output, thus through the rear wall of the housing 3.

The bottom 3a of the housing 3 thus serves as a base surface 17 for a raised portion 18, extending centrally downward outward there from, which in turn is provided pot shaped, and which comprises two diametrically opposed tangentially oriented indentations 20, into whose base the pass-through openings 14, preferably with inner threads 12 for the cable 26, open out. The pass-through openings 14 thus extend in parallel to the main plane, and thus to the bottom 3a of the pot shaped housing 3, into the side wall of the also pot shaped raised portion 18, which is provided integral with the remainder of the housing 3.

Thus, the configuration of this indentation 20 is quite important, which comprises an inner flank 21 and an outer flank 22, with respect to the center of the housing 3, viewed in axial direction.

In the simplest case the indentation 20 is shown rectangular with a flank in the direction of the extension of the cable 26, as described above on the left. On the lower right side the preferred embodiment is shown.

While the outer flank transitions into the outer contour 17' of the base surface 17 in a convex cambered arc shape, viewed in FIG. 4b, the inner flank transitions approximately parallel to the outer flank 22 in a concave camber into a tip 23, which, on the one hand, is formed by the outer contour 17' and, on the other hand by the outer flank 22.

As shown by FIG. 4b on the right bottom, the cable 26 can be routed in this manner in the plane of the elevated portion 18, and in parallel to the bottom 3a of the housing 3, radially, or if required, also tangentially away from the housing 3, wherein the inner flank 21 avoids a kinking of the cable.

By the same token, the cable 26, however, as shown in FIG. 4b in the left upper side, can be run out axially by using the portion of the indentation 20 for redirecting the cable 26 into an axial direction, thus parallel to the longitudinal axis 10 of the housing 3, wherein this cavity typically suffices, so that the cable 26 hereby does not radially protrude beyond the outer rim of the housing 3, and also does not have to be kinked too much, since in addition to the bending into the axial direction, also a tangential guidance is performed along the inner flank 21, and thus the bending is performed in a comparatively gentle manner.

The FIGS. 5 and 6 show additional possibilities, how to improve the measuring precision of the sensor unit 100.

Thus, FIG. 5 shows a sensor unit 100, which corresponds to the one of FIG. 3a besides the fact that in FIG. 5 an additional intermediary unit 70 is provided in the angle sensor 1.

The intermediary unit 70 is a disk shaped body, which is disposed in the housing 3 of the angle sensor 1, and preferably also within its shielding 101a, and thus in front of the sensor element 4, so that it is disposed between the sensor element 4 and the magnet unit 50.

The exterior circumference of the intermediary unit 70 can be sized, so it fits the inner circumference of the pot shaped sensor shielding 101a, and/or the intermediary unit 70 can be mounted to the inside of the front cover 25, which is provided here as a slide-over cover.

In the intermediary unit 70, an encoder magnet 71 is disposed with its pole axis 72 in the direction of the main axis of the disk shaped intermediary unit 70, and thus perpendicular to the longitudinal axis 10a of the angle sensor 1 on this longitudinal axis rotatable in the intermediary unit 70.

In order to achieve a support that has as little friction as possible, the encoder magnet 71 is supported in the encoder unit 70 by means of a magnetofluid or ferrofluid 73, which constitutes a lubricant and the bearing, and which adheres to the magnet, due to very fine iron particles, which are dissolved in the lubricating fluid.

Thereby, the lubricant always stays in the support gap. Running the bearing dry is avoided without any additional measures.

The magnet lines of the two encoder magnets 50a, b in this case, thus impact the intermediary magnet 71 and rotate with it, and its field lines initially impact the sensor element 4.

The advantage is that the intermediary magnet 71 is always in the same defined correct axial position with respect to the sensor element 1.

An axial or radial offset of the encoder magnet(s) 50a, b relative to the longitudinal axis 10 still causes an angle synchronous engagement of the intermediary magnet 71, and thus initiates a correct measurement at the sensor element 4, which would be performed significantly worse under the direct effect of incorrectly placed encoder magnets 50a, b, relative to the sensor element 4, under direct effect.

The solution of FIG. 6 has the same object and differs from the one in FIG. 1a only through the configuration of the front cover 25.

Said front cover is comprised of magnetically conductive material, e.g. soft magnetic highly permeable materials, in particular magnetic NiFe-alloy, e.g. the Permalloy group, which is paradox at first glance, since hereby a shielding effect is accomplished relative to the encoder unit 50, which is intended to impact the sensor element 4.

This is actually the case in the radially exterior portions of the front cover 25, since it has a relatively large wall thickness.

In the center portion around the longitudinal axis 10a, on which also the sensor element 4 is located, the material thickness of the front cover 25, which shields in principle is reduced strong enough, so that the field strength of the magnet unit 50 suffices in order to not only saturate this small wall thickness magnetically, but to furthermore permeate it with field lines up to the sensor element 4.

The advantageous effect is thus that in a not correctly aligned encoder unit 50, like e.g. shown in FIG. 6, in case of an eccentrically slightly offset rotation axis 10b of a magnet unit 50, the field lines originating from the encoder magnets 50a, b are centered by the portion of the reduced wall thickness to its center, this means the sensor element 4, and thus the measurement result is degraded less through the incorrect spatial alignment of the magnet 50 with the angle sensor 1, than without such configuration of the cover 25.

What is claimed:

1. A sensor unit (100), said sensor comprising:
   an Hall or magnetoresistive angle sensor (1) detecting around its longitudinal axis (10*a*), includes a magnetically sensitive face surface portion and a sensor element (4) proximal to a face surface (2*a*) which is fixed in place; and
   at least one magnet unit (50) disposed so that its magnetic field permeates the angle sensor (1), and field lines of at least one encoder magnet (50*a*) of the at least one magnet unit (50) extend parallel to a sensitive plane (4') of the sensor element (4) wherein the encoder magnet is rotatable; and
   a magnetically conductive shielding (101) made of ferromagnetic material including at least one sensor shielding fixed in place and an encoder shielding rotatable together with the encoder magnet (50) wherein said sensor shielding (101*a*) is disposed closer than 6 mm to said sensor element (4), and the material of said sensor shielding (101*a*) has a coercitive field strength HC<5 A/cm.

2. A sensor unit (100) according to claim 1 wherein said at least one sensor shielding (101*a*) includes longitudinal sides (11*a, b*) of said angle sensor (1) in a longitudinal portion wherein said sensor element (4) is disposed, and a backside of said sensor element (4), and said face surface (2*a*) most proximal to said sensor element (4) is closed magnetically permeable.

3. A sensor unit (100) according to claim 1 wherein said encoder shielding (101*b*) shielding at least one encoder magnet (50*a*) on the backside facing away from said sensor (4) and on said longitudinal sides (11*a, b*).

4. A sensor unit (100) according to claim 1 wherein said conductive shielding (101) is comprised of two half shells facing each other with their open sides, one half shell forming said sensor shielding (101*a*) and the other half shell forming said encoder shielding (101*b*).

5. A sensor unit (100) according to claim 1 wherein said sensor shielding (101*a*) has a round inner contour, disposed, with respect to its inner contour, symmetrical to the longitudinal axis (10) of the angle sensor (1).

6. A sensor unit (100) according to claim 1 wherein said conductive shielding (101) has a high permeability in the range of $\mu$>100 to >50,000.

7. A sensor unit (100) according to claim 1 wherein said magnetic shielding (101) is a separate component.

8. A sensor unit (100) according to claim 1 wherein said shielding (101) is composed of material selected from the group consisting of: plastic bound ferrite, hard ferrite, and nanocrystalline iron.

9. A sensor unit (100) according to claim 1 wherein said magnet unit (50) includes two encoder magnets (50*a, b*) having pole axes disposed parallel to a rotation axis (10*b*) and opposite to each other.

10. A sensor unit (100), said sensor comprising:
    an Hall or magnetoresistive angle sensor (1) detecting around its longitudinal axis (10*a*), including a magnetically sensitive face surface portion and a sensor element (4) proximal to a face surface (2*a*) which is fixed in place;
    at least one magnet unit (50 disposed so that its magnetic field permeates the angle sensor (1), and field lines of at least one encoder magnet (50*a*) of the at least one magnet unit (50) extend parallel to a sensitive plane (4') of the sensor element (4) wherein the encoder magnet is rotatable;
    a magnetically conductive shielding (101) made of ferromagnetic material including at least one sensor shielding fixed in place and an encoder shielding rotatable together with the encoder magnet (50); and
    an intermediary unit (70) between said angle sensor and said at least one magnet unit in which at least one intermediary magnet (71) is disposed with its pole axis (72) extending parallel to a sensitive plane (4) of said sensor element (4) rotatable around a longitudinal axis (10*a*) in the intermediary unit (70) by means of ferrofluid (73) wherein two encoder magnets (50*a, b*) impact the intermediary magnet (71) and rotate with it.

11. The sensor unit (100) according to claim 10 wherein said intermediary unit (70) is fixed in place in said housing (3) of said angle sensor (1) or in the housing of said magnet unit (50).

* * * * *